(No Model.)
C. F. POWELL.
ANTI-INTERFERING DEVICE.
No. 438,086. Patented Oct. 7, 1890.
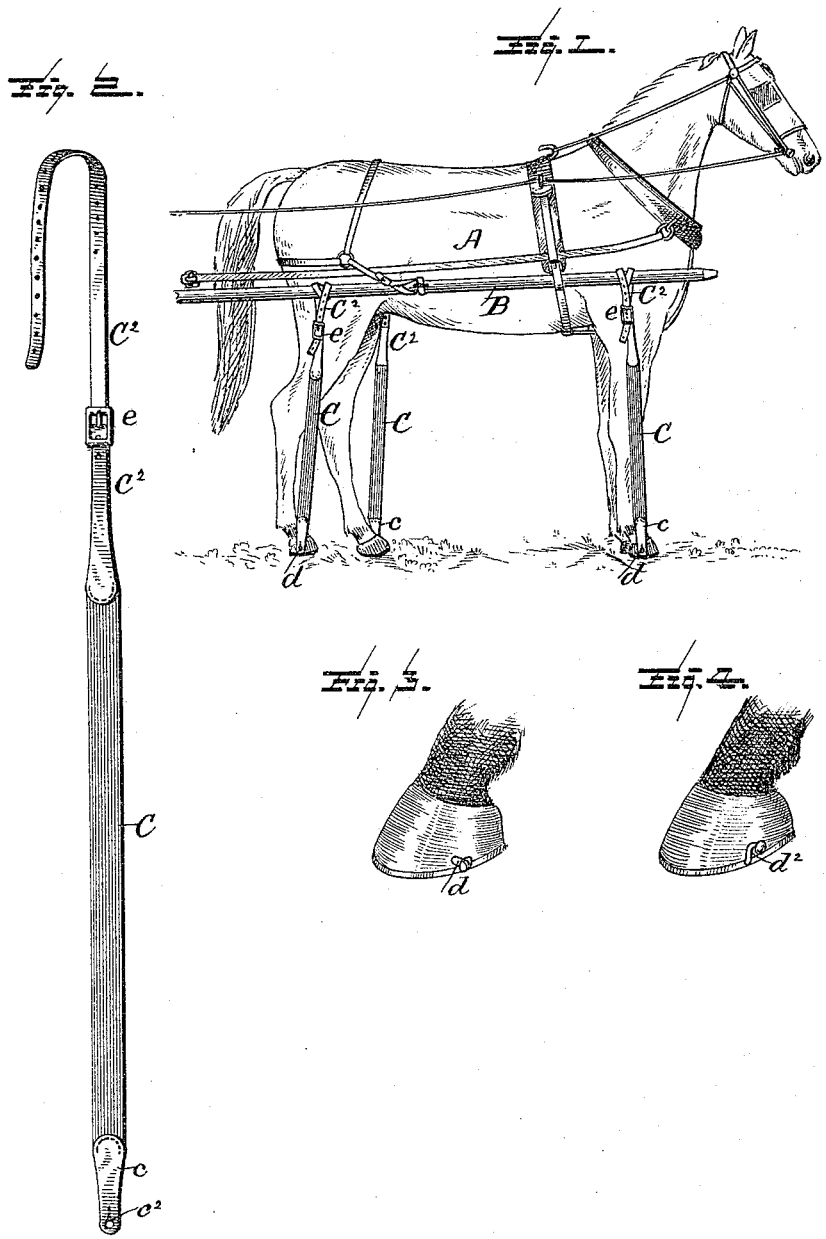
Witnesses
L. C. Hills
C. C. Schiller, Jr.
Inventor
Charles F. Powell
by E. E. Masson
Attorney

UNITED STATES PATENT OFFICE.

CHARLES F. POWELL, OF MINNEAPOLIS, MINNESOTA.

ANTI-INTERFERING DEVICE.

SPECIFICATION forming part of Letters Patent No. 438,086, dated October 7, 1890.

Application filed June 10, 1890. Serial No. 354,899. (No model.)

*To all whom it may concern:*

Be it known that I, CHARLES F. POWELL, a citizen of the United States, residing at Minneapolis, in the county of Hennepin, State of Minnesota, have invented certain new and useful Improvements in Devices to Prevent Interfering and Stumbling of Horses' Feet, of which the following is a specification, reference being had therein to the accompanying drawings.

The objects of my invention are to provide a simple and convenient device to cure horses of the defect of "interfering" and of stumbling, said device being as readily applied to the fore legs as to the hind legs of a horse, and has a tendency to give to the hoof-joint a laterally-outward bend and to lift the horse's feet, the latter operation, drawing the attention of the horse to his fore feet, greatly preventing stumbling. I attain these objects by the construction illustrated in the accompanying drawings, in which—

Figure 1 represents a side view of my invention applied to a horse and to the shafts of a vehicle. Fig. 2 represents the device detached and on a larger scale. Fig. 3 is a side view of the hoof and shoe of a horse with the lower attachment of the device screwed into the hoof. Fig. 4 is a side view of the hoof and shoe of a horse with the lower attachment of the device projecting from the side of the shoe.

In said drawings, A represents a horse carrying the shafts B of a vehicle and connected thereto by any suitable harness.

C represents a strong elastic strap of incased rubber having at one end a re-enforcing leather tip $c$, provided with a longitudinal slit or button-hole $c^2$ to receive as a button the shank of a bolt or screw $d$ or other suitable extension and be retained thereon by its head, as said screw is inserted in the side of the hoof nearly in contact with the shoe D; or a headed projection $d^2$ is formed on the side of the shoe to engage with the tip of the elastic strap, and the latter has secured to its opposite end a leather strap $C^2$, which can be wrapped any desired number of turns around the shafts of the vehicle or around some strong part of the harness and have its ends adjustably secured to the body of said strap $C^2$ by means of a buckle $e$, secured to said body between its free end and the elastic strap.

The device can be applied to the fore legs as well as to the hind legs of a horse. The elastic strap should be stretched taut, so that when the horse lifts his foot the elastic strap will draw it upward and laterally outward, so as to prevent interference of his feet and also stumbling.

This device is to be worn on both sides of the horse at the same time and can be on the two front or two hind feet, as the case may be, and the elastic can be tightened as the severity of the case requires.

After wearing the device some time, the horse will form the habit of throwing his feet outward and lifting them quickly and be permanently cured of the interfering and stumbling habits.

The projection or screw attachment can be located more or less forward on the horse's foot, according to the peculiarity of the horse's feet and the defect to be cured, and a screw or lug can be secured to the fore end of the shafts to keep the strap from slipping off said ends when speeding the horse.

I am aware that horse-leg spreaders have been produced by means of pendent arms pivoted to the shafts of vehicles in connection with elastic straps attached to said arms and to the hind legs of a horse above the hoof-joint. I am also aware that leather bands have been placed around the hind legs of a horse above the hock and connected to the shafts of a vehicle by means of elastic bands. I am also aware that trotting-gears have been made of elastic straps having one end adjustably attached to the collar and the other end to the legs of a horse above the hoof-joint, and I do not claim either one of said constructions.

Having now fully described my invention, I claim—

An anti-interfering device for horses, consisting of an elastic strap C, having at one end a re-enforcing leather tip $c$, provided with a longitudinal slit therein and at the other end a leather strap $C^2$ and a buckle $e$, secured to said strap between its free end and the elastic strap, whereby said strap is adapted to have one end adjustably secured to the shafts of a vehicle and the other end to a headed projection secured to the side of the hoof or shoe of a horse, substantially as described.

In testimony whereof I affix my signature in presence of two witnesses.

CHARLES F. POWELL.

Witnesses:
H. D. L. BROWN,
ANDREW C. ROBERTSON.